United States Patent
Bobolts

[15] 3,696,945
[45] Oct. 10, 1972

[54] BLOCK CUBING APPARATUS
[72] Inventor: Elroy F. Bobolts, Alpena, Mich.
[73] Assignee: Besser Company, Alpena, Mich.
[22] Filed: Dec. 9, 1970
[21] Appl. No.: 96,469

[52] U.S. Cl..............................................214/6 G
[51] Int. Cl..............................................B65g 57/10
[58] Field of Search....214/6 P, 6 PK, 6 G, 6 FS, 6 A, 214/6 H, 6 F

[56] References Cited

UNITED STATES PATENTS

| | | | |
|---|---|---|---|
| 2,958,431 | 11/1960 | Curtenius | 214/6 DK |
| 2,065,673 | 12/1936 | Fay, Jr. | 214/6 DK |
| 3,130,839 | 4/1964 | Grasvoll | 214/6 DK |
| 3,111,233 | 11/1963 | Raynor | 214/6 P |
| 2,875,907 | 3/1959 | Locke et al. | 214/6 P |
| 3,529,732 | 9/1970 | Wayne | 214/6 G |
| 3,520,422 | 7/1970 | Bruce et al. | 214/6 DK |

FOREIGN PATENTS OR APPLICATIONS

| | | | |
|---|---|---|---|
| 964,411 | 7/1964 | Great Britain | 214/6 G |
| 457,515 | 8/1968 | Switzerland | 214/6 DK |

Primary Examiner—Robert J. Spar
Attorney—Learman & McCulloch

[57] ABSTRACT

Block cubing apparatus for stacking tiers of blocks, such as cement building blocks, in cubes comprising: a support member on which the tiers of blocks are to be stacked, independently movable block height sensing mechanism engageable with the uppermost tier of blocks on the support member to positively locate the sensing mechanism relative to the uppermost tier of blocks thereon, and a block transfer system responsive to the sensing mechanism for moving tiers of blocks upwardly to the level ordained by the sensing mechanism and thence moving them laterally to a position in which they are released to and supported by the uppermost tier of blocks on the support member.

19 Claims, 5 Drawing Figures

INVENTOR
ELROY F. BOBOLTZ
BY
Learman & McCulloch,
ATTORNEYS

INVENTOR
ELROY F. BOBOLTZ

BY

Learman & McCulloch

ATTORNEYS

BLOCK CUBING APPARATUS

FIELD OF THE INVENTION

This invention relates to block cubing apparatus including a support on which tiers of blocks are to be stacked and a block loading carriage which successively moves tiers of blocks to a stacking position over the support member. More particularly, this invention relates to mechanism for positioning the block transfer carriage relative to the uppermost tier of blocks supported on the support member.

BACKGROUND OF THE INVENTION

Block cubing machines which have been previously constructed include block transfer plates which are moved upwardly by an elevator, thence laterally to a stacking position over the cube supporting member, and which then are withdrawable to discharge a tier of blocks. In one previous construction, photoelectric apparatus mounted on the elevator for movement therewith, is utilized to sense the height of the cube and control the extent of vertical movement of the elevator relative to the stacked tiers of blocks. When the elevator is moved upwardly a sufficient distance so that the photoelectric apparatus and the block support plate clears the uppermost tier of blocks, the elevator is stopped by reestablishment of the photoelectric beam and the transfer plate is then moved laterally to a position over the cube of blocks being stacked. With a system of this kind, the elevator and carriage are not sufficiently precisely vertically positioned and occasionally the elevator will be moved too far upwardly so that, when the support plate is removed from a position beneath the blocks, the blocks will drop too far and be damaged. If the system is adjusted such that the elevator stops instead just below the upper surface of the stack of blocks, and it is attempted to then move the tier of blocks laterally to a position over the stack, the tier being transferred engages the uppermost tier of blocks in the stack and interrupts the cycle of operation. Accordingly, it is an object of the present invention to provide sensing apparatus incorporated with a block cubing machine which will precisely position block transfer apparatus relative to the uppermost tier of blocks stacked. It is another object of the present invention, therefore, to provide an independently movable block height sensing device for a block cubing machine.

It is a further object of the present invention to provide block cubing apparatus including a block height sensing mechanism which physically engages the uppermost tier of blocks stacked and which is subsequently movable to a raised inoperative position when an additional tier of blocks is to be stacked.

Other objects and advantages of the present invention will become apparent to those of ordinary skill in the art as the description thereof proceeds.

SUMMARY OF THE INVENTION

Block cubing apparatus for stacking tiers of blocks in cubes comprising: support means on which tiers of blocks are to be stacked, a block transfer member disposable in a block receiving position for receiving and supporting blocks and movable to a discharge position over the support means, means moving the transfer member between the block receiving and discharge positions including means for elevating the transfer member from the block receiving position to a raised position above the uppermost tier of blocks on the support means, means for removing the transfer member from the blocks supported thereby when the transfer member is over the support means to release the blocks to be supported by the support means, and means for determining the elevation to which the transfer member is to be raised comprising block height sensing means movable independently of the elevating means between a raised position and a lowered position to positively locate the sensing means relative to the uppermost tier of blocks, means for moving the sensing means between the raised and lowered positions, and means supported on the elevating means and responsive to the sensing means as the transfer member is moved upwardly for interrupting further upward movement of the transfer member.

The present invention may more readily be described by reference to the accompanying drawings in which.

GENERAL DESCRIPTION OF THE INVENTION

Figure 1:
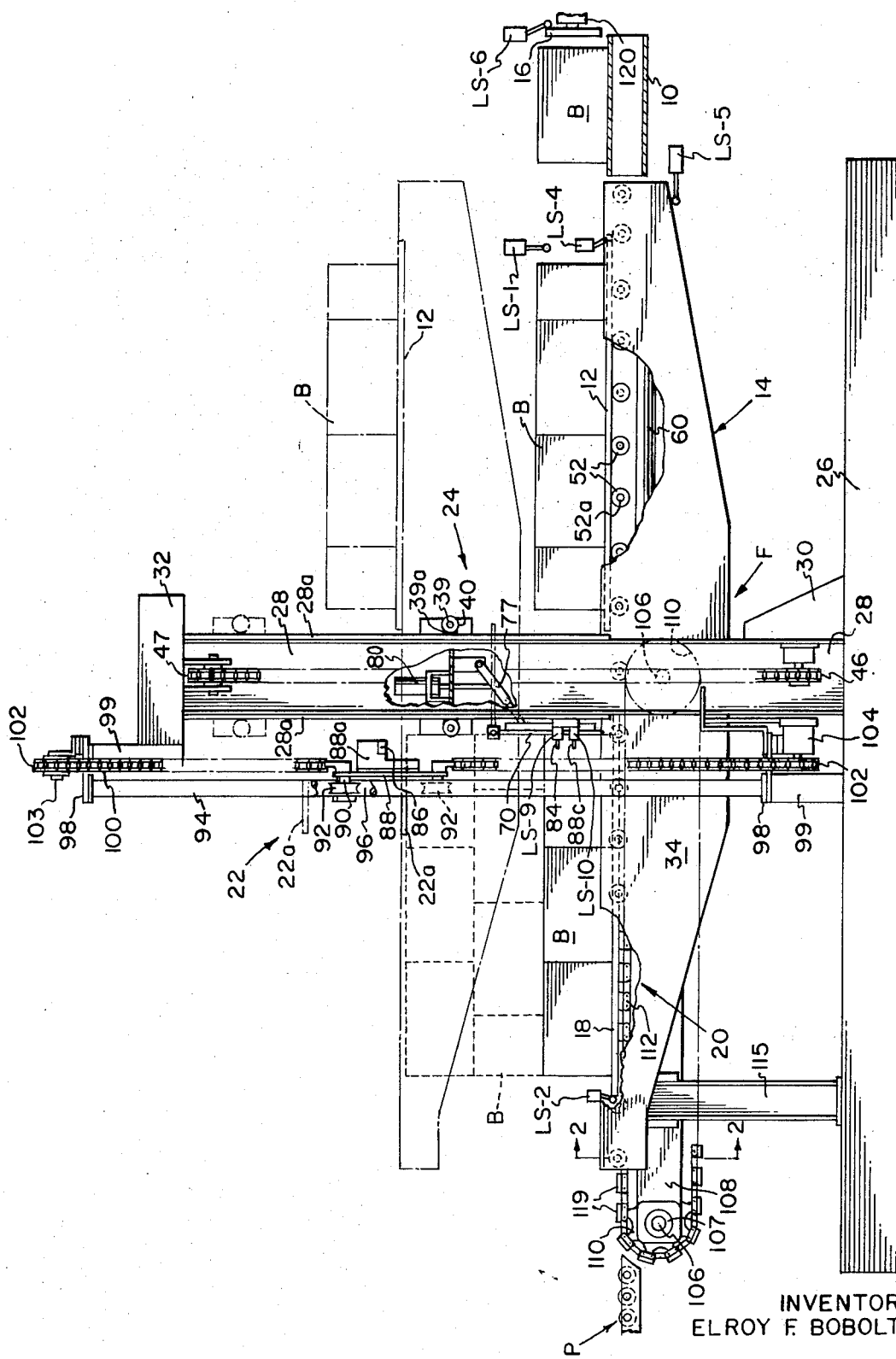
FIG. 1 is a side elevational view, illustrating block cubing apparatus constructed according to the invention, with parts in adjusted positions being illustrated in phantom lines and other parts being broken away for purposes of clarity.

Concrete blocks, generally designated B, are delivered by a supply conveyor 10 (FIG. 1) to a pattern-forming area and then moved by a pusher 16 onto a support or transfer plate 12 movably supported on an elevator generally designated 14. After the first tier of blocks B have been positioned on the plate 12, the plate 12 is then moved to a position over a cube discharge conveyor 20 and a pallet 18 thereon. The plate 12 is then withdrawn, and a stripper mechanism, generally designated 24, is moved into the path of the blocks to strip them from the plate 12, as the plate 12 is withdrawn so that they are deposited on the pallet 18 supported on the cube conveyor 20. In some instances no pallet is employed dependent on subsequent handling which is contemplated. At this same time, a block height sensing mechanism 22 commences to move downwardly from a raised position to an operative position in which it physically engages the first tier of blocks supported on the pallet 18. The pusher 16 then moves a second tier of blocks onto the plate 12 and the elevator 14 is moved upwardly until the limit switches designated LS–9 and LS–10 engage the sensing mechanism 22 to halt the upward movement of the elevator 14 so that the plate 12 is above the first layer of blocks. The sensing mechanism 22 is then raised to the inoperative position illustrated in chain lines in FIG. 1. Thereafter plate 12 is moved relative to the elevator 14 to position the second tier of blocks over the first tier of blocks and the stripper mechanism 24 is again moved into the path of the blocks supported on plate 12 to strip the blocks therefrom as the plate 12 is withdrawn. The elevator finally is returned to the lower starting position and the sensing mechanism 22 again moves downwardly into engagement with the uppermost surface of the second tier of blocks. The cycle repeats until the desired cube height is reached whence conveyor 20 is operated to discharge the cube to a discharge conveyor P.

THE ELEVATOR

Apparatus constructed according to the invention is supported on a frame, generally designated F, including a pair of laterally spaced upstanding support posts or columns 28, supported at their lower ends on a base 26 and spanned, at their upper ends, by a rigidifying brace member 32. Reinforcing gussets 30 are connected between the base 26 and upstanding members 28 to further rigidify the frame.

The elevator 14 is supported on the support posts 28 for vertical movement and includes a pair of horizontally disposed side plate members 34 (FIG. 2), spanned by suitable cross members 36. At their mid-portions, the side plates 34 include vertically extending guide plates 38 (FIG. 3), each mounting a pair of axle supporting blocks 39a (FIG. 1) which include horizontally disposed axles 39 supporting a pair of guide wheels 40 that guide on wear strips 28a provided on opposite sides of the support members 28 for guiding upward movement of the elevator.

Figure 2:
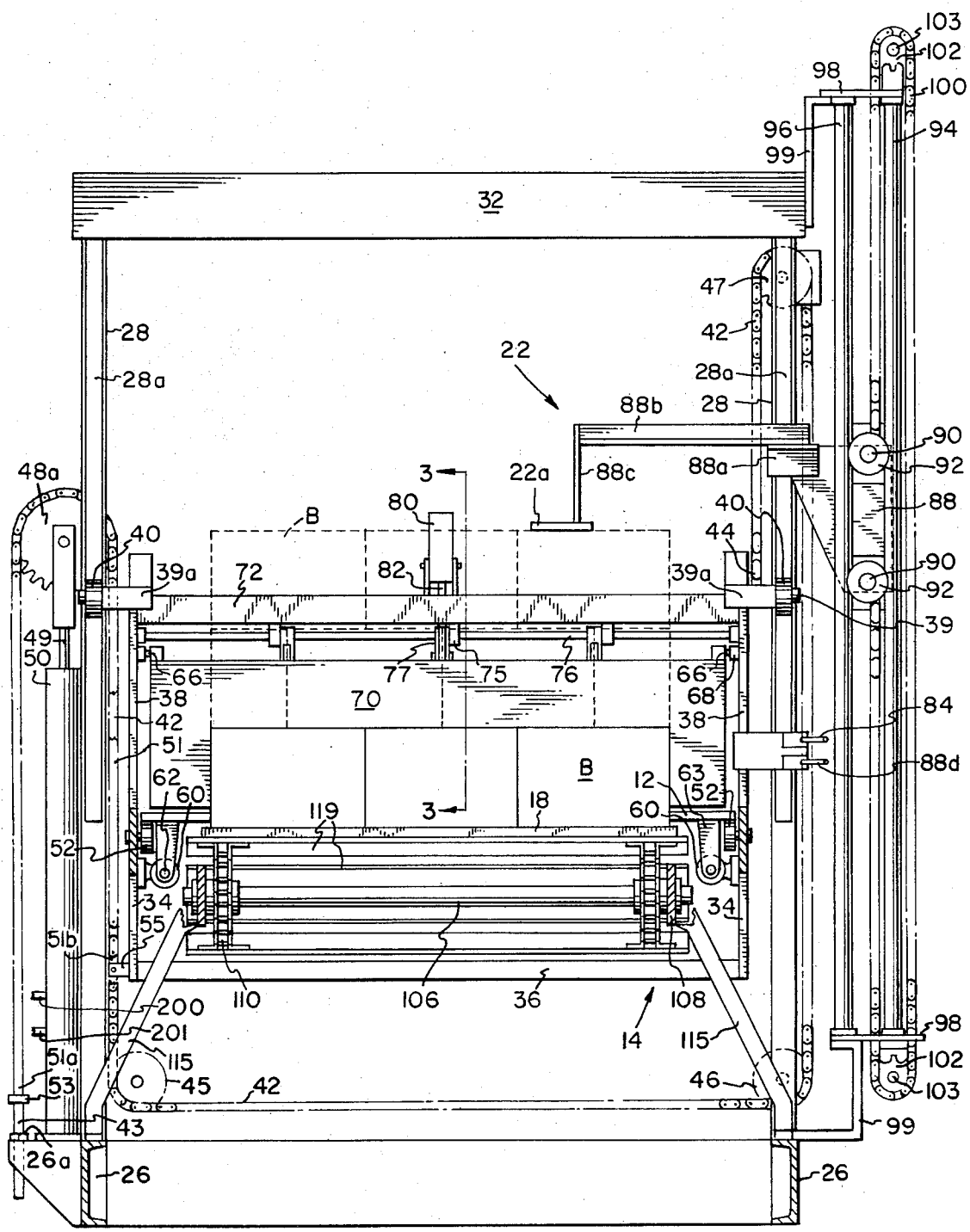
FIG. 2 is a sectional, front elevational view, taken along the line 2—2 of FIG. 1, with parts being broken away to more clearly illustrate certain portions thereof.
Figure 3:
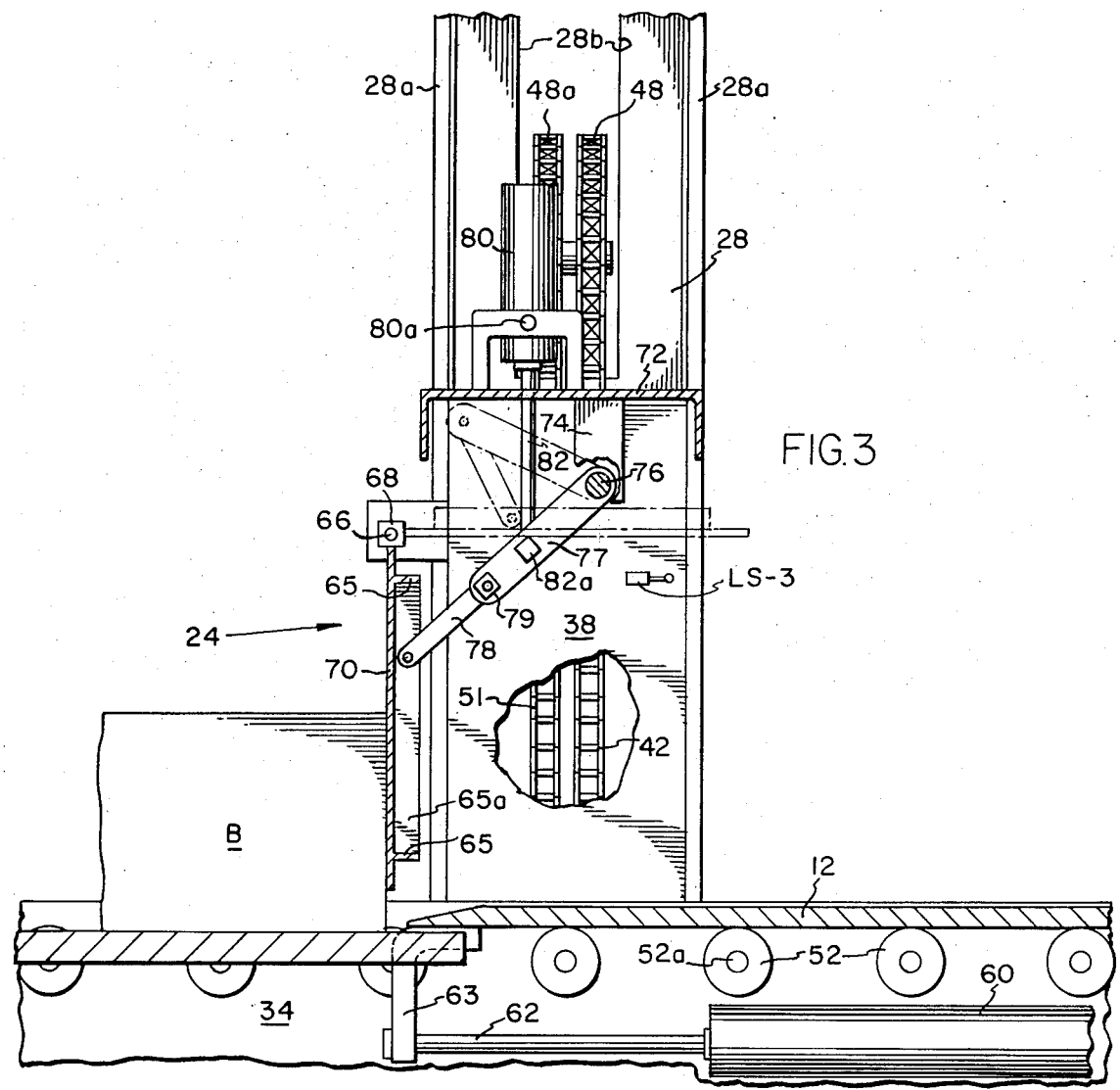
FIG. 3 is a sectional side view, taken along the line 3—3 of FIG. 2 and particularly illustrating the mechanism for stripping the blocks from the carriage.

The right hand elevator side plate 34 (as viewed in FIG. 2) is supported on the right hand post 28 by means of a chain 42 (FIG. 2), having one end 43 fixed to the frame base 26 at 26a and having its other end 44 fixed to the right one of the elevator guide plates 38. The chain 42 is trained around a series of sprocket wheels 45, 46 and 47 rotatably mounted on the frame F and a sprocket wheel 48 journaled on the piston rod 49 of a double acting, hydraulically operated cylinder 50 supported on the base 26. As illustrated in FIG. 3, the support post 28, adjacent the cylinder 50, is slotted along its length, as shown at 28b, to pass the chain 42 as the piston rod 49 is moved upwardly to raise the side plates 34.

The left one of the side plates 34 is supported on the frame F by a chain 51 (FIGS. 2 and 3) fixed at one end 51a to a turnbuckle 53 on the frame F and at its other end 51b to a mounting block 55 fixed to the left side wall 38. The chain 51 is trained around a second sprocket wheel 48a rotatably supported on the piston rod 49. As the piston rod 49 is extended, the sprocket wheels 48 and 48a drive the chains 42 and 51 upwardly to raise the elevator. When the piston rod 49 is retracted, the elevator is gravity-lowered.

BLOCK TRANSFER CARRIAGE

Journaled on spindles 52a, provided on the elevator side walls 34, are a plurality of freely rotatable rollers 52 which support the loading plate or block supporting carriage plate 12 for movement thereon between the position shown in FIG. 1 and a position over the pallet 18 on the conveyor 20. The plate 12 spans the rollers 52 and is reciprocably movable thereon by a pair of laterally spaced cylinders 60 (FIGS. 1 - 3) having piston rods 62 connected to lugs 63 depending from the sides of plate 12.

STRIPPER MECHANISM

For removing the blocks B from the carriage plate 12, as the plate 12 is withdrawn from its position over the pallet 18, stripper mechanism, generally designated 24, is provided and includes a frame having upper and lower support bars 65 (FIGS. 3 and 4), spanned by vertical bars 65a, and mounting a plate 70 for engaging the rearwardmost blocks of the tier just transferred to prevent the tier of blocks from returning with the plate member 12 when the plate member 12 is withdrawn. For swingably mounting the plate 70, pivot pins 66 are provided on opposite ends thereof and are supported by bearings 68 mounted on the elevator side plate 38.

Figure 4:
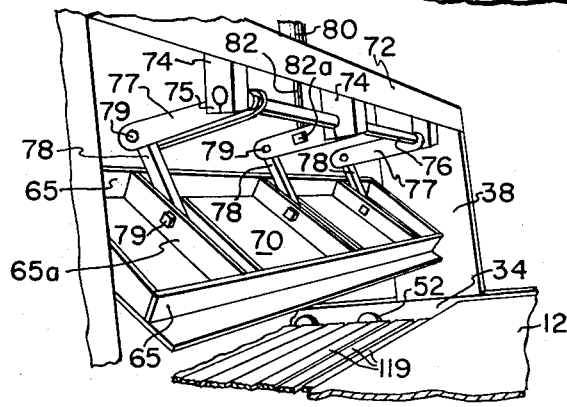
FIG. 4 is a fragmentary perspective, rear elevational view, particularly illustrating the stripping mechanism.

The stripper mechanism 24 is mounted on framework 72 (FIG. 4) spanning the elevator guide plates 38 and having dependent brackets 74 terminating in bearing blocks 75 journaling a shaft 76. Welded, or otherwise suitably secured, to the shaft 76 are three parallel, laterally spaced apart links 77 pivotally connected, by pins 79, to three links 78 which are fixed to the bars 65a on the back side of plate 70. For moving the stripping plate 70 between the solid line position, shown in FIG. 3, and the chain line position also shown in FIG. 3, a double acting, hydraulically operated cylinder 80, is pivoted on pins 80a supported by the subframe assembly 72, and includes a piston rod 82 connected by a pin 82a, with the center link of the three links 77. When the piston rod 82 is retracted, the links 77 pivot upwardly (as shown in FIG. 4) to raise the plate 70 to the chain line position illustrated in FIG. 3 and permit the passage of another tier of blocks thereunder. When the piston rod 82 is moved downwardly, the links 77 and 78 are moved to a substantially dead center position to lock the plate 70 in position and prevent its movement as the plate 12 is moved rearwardly to its starting position and the blocks B supported on plate 12 come into engagement with the front face of stripping plate 70.

BLOCK HEIGHT SENSING MECHANISM

The block height sensing mechanism 22 for sensing the position of the uppermost tier of blocks on pallet 18 and for interrupting the upward movement of the elevator 14 includes a carriage 88 having a pair of spindles 90 on which a pair of guide wheels 92 are journaled. The guide wheels 92 are constructed with continuous annular peripheral grooves for guiding on a pair of tracks 94 and 96 which are connected at opposite ends to a pair of support plates 98 that are fixed to the cross piece 32 and the base 26 by brackets 99. The carriage 88 includes a transversely extending support block 88a mounting a transverse bracket 88b supporting a dependent leg 88c on which a feeler plate 22a is mounted for movement therewith between the raised, inoperative position, illustrated in chain lines in FIG. 1, and the lowered, solid line position, illustrated in FIGS. 1 and 2, in which it physically engages at least one of the blocks of the uppermost tier of blocks.

For vertically moving the carriage 88, a chain 100 is trained around a pair of vertically spaced sprocket wheels 102 fixed on a pair of shafts 103 that are supported on one of the support posts 28. Opposite ends of the chain 100 are fixed to the upper and lower portions of the carriage 88. The output shaft (not shown) of a rotary hydraulic fluid motor such as disclosed in U.S. Pat. No. RE. 25,291, and schematically illustrated at 104 in FIG. 1, is connected with the drive shaft 103 of the lower sprocket wheel 102. The hydraulic circuit for supplying motor 104 with fluid is constructed with suitable relief valves so that, when the motor 104 has driven the chain 100 to move the feeler plate 22a into engagement with the uppermost tier of blocks, the fluid is by-passed around motor 104 and the feeler plate 22a will remain in engagement with the uppermost tier of blocks.

When the elevator 14 is to be moved upwardly by the cylinder 50, apparatus is provided for initially driving the cylinder 50 at a relatively rapid state and includes a pair of valves (not shown) individually actuated by a solenoid 130 (FIG. 5) and a solenoid 50a (FIG. 5) to provide hydraulic fluid along plural paths 200 and 201 to the cylinder 50. For limiting the flow of fluid to the hydraulic cylinder 50, after the elevator 14 is raised a predetermined distance, a limit switch LS-9 (FIG. 1) is mounted on the carriage 14 and includes a plunger 84 which is actuated by an actuating member 86 fixed to carriage 88 and positioned in the path of plunger 84 when the sensing mechanism 22 is resting on top of the uppermost tier of blocks. The limit switch LS-9 includes a set of normally open contacts LS-9a (FIG. 5) which close when the plunger 84 is actuated to close one of the valves directing fluid to the cylinder 50. After the elevator 14 has been raised a slightly greater distance, a plunger 88d on the limit switch LS-10, which is supported on the elevator 14, engages the actuator 86 to deenergize the solenoid 50a (FIG. 5) so that the flow of fluid to the hydraulic cylinder 50 is interrupted and the elevator 14 is held in position.

SUPPLY AND DISCHARGE CONVEYORS

For delivering the blocks B to the transfer plate 12, an endless belt conveyor 10 is trained around front and rear pulleys (not shown) to transport blocks B to a pattern forming area (not shown) where the blocks may be manually or mechanically turned to form selected patterns. The pusher 16 may be selectively actuated to move the blocks B from the pattern-forming area to the transfer plate 12, by means of a double-acting, solenoid actuated, hydraulically operated cylinder 120 having advance and retract solenoids 120a and 120b (FIG. 3).

The cube conveyor 20, disposed between the forward portions of the side plates 34, includes a pair of front and rear shafts 106, journaled in bearings 107 mounted on a pair of side rails 108. Pairs of sprockets wheels 110 are fixed to the shafts 106 and endless link chains 112 are trained therearound and mount a plurality of slats 119 for supporting a pallet 18. The conveyor side frames 108 are supported on the frame 26 by support posts 115.

THE CONTROL CIRCUIT

A pair of lines L1 and L2 are connected across a suitable source of power such as 110 volt, 60 cycle, alternating current. A plurality of circuits and sub-circuits are connected in the lines, designated L3–L29, which are connected across the lines L1 and L2. A switch S is connected in line L1 for selectively disabling operation of the machine. Connected in circuit lines L8, L19, L24, L5, L28, L4 and L17 are control relays designated 1C, 2C, 3C, 4C, 5C, 7C, and 8C respectively. Each of these relays includes normally open sets of contacts and normally closed sets of contacts which are closed and opened respectively when the relay is energized. The contacts for each relay are designated with the same reference character as that of the relay with a numeral subscript. For example, the relay 4C in line L5 includes sets of normally closed sets of contacts 4C1 and 4C4 in lines L5 and L3 and normally open sets of contacts 4C2 and 4C3 in lines L11 and L12, which are opened and closed respectively when the relay 4C is energized. The relays 3C, 4C, 7C and 8C are permanent magnet latch relays of the type which include permanent magnets (not shown) for holding the relays energized once their respective relay latching coils have been electrically pulsed, and deenergizing unlatching coils 3CU, 4CU, 7CU and 8CU respectively connected in lines L7, L12, L22 and L6 respectively. When an unlatching coil is energized, the flux pattern in the magnetic holding circuit of the relay will be interrupted or distorted so that the holding magnet will release the relay to its original starting position. Relays of the type manufactured by Allen Bradley Corporation, Milwaukee, Wisconsin, as Model 700–NM–600 are suitable for this purpose.

Connected in line L5 is a set of normally open contacts LS–5a, which are closed when the limit switch LS–5, mounted on the frame F in any suitable manner, is actuated when the elevator 14 is moved to the lowermost position illustrated in FIG. 1. Connected between the limit switch contacts LS–5a, in line L5, and the line L2 is a block transfer starting switch S2, a set of normally open contacts 5C1 which are closed when the relay 5C is energized, a set of normally closed contacts 4C1, and the control relay 4C for starting the block transfer pusher member 16 forwardly. Connected between the junction 116 of the contacts LS–5a and the switch S2, and the line L2 is a circuit line L6 including a set of normally open contacts 8C3 which close when the control relay 8C is energized, and the unlatching coil 8CU for returning the relay 8C to its original position. Connected in series circuit in line L7, between the junction 116 and the line L2, is a set of normally open limit switch contacts LS–6a, which are closed when the pusher 16 is in its rearwardmost position, as illustrated in FIG. 1, to actuate the limit switch LS–6, an elevator raise start switch S3, a set of normally open contacts 3C3, which are closed when the relay 3C is energized, and the unlatching coil 3CU for the relay 3C. Also connected between the junction 116 and line L2 is a cube conveyor start switch S1 (line L3) and the armature of an electrical motor M1 which includes a shaft (not shown) connected with the forward shaft 106 for driving the cube conveyor 20. Connected in parallel with the motor M1 (line L4) is a set of normally closed contacts 7C1 which open when the control relay 7C is energized and the relay 7C which operates to hold the sensor mechanism 22 in a raised position, as will be described more fully hereinafter.

Connected in series in line L8 is a relay 1C for starting the elevator 14 moving upwardly, sets of normally closed contacts 2C1, 7C4 and 3C1 which are opened when the relays 2C, 7C, and 3C are energized, and a set of normally open holding contacts 1C1 which are closed when the relay 1C is energized. The junction 120 between the switch S3 and the contacts 3C3 is connected to the junction 122 between the contacts 1C1 and 3C1 to provide a current path from the junction 120 to the solenoid 50a (line L9) which is connected in series circuit relation with the normally open contacts 1C2 which are closed when the relay 1C is energized. The solenoid 50a (line L9), when energized, actuates a valve (not shown) which directs fluid to the cylinder 50 so as to raise the elevator 14 slowly. Connected to the junction 123 between the contacts 1C2 and the solenoid 50a, is a holding circuit (line L10) including sets of normally closed contacts 7C1 and 8C1, which are opened when the relays 7C and 8C are energized, and normally open sets of contacts 2C4 and 5C5, which are closed when the relays 2C and 5C are energized respectively.

A solenoid 120a (line L11) for actuating a valve (not shown) which will direct fluid to the cylinder 120, so as to move the pusher 16 forwardly, is connected in series circuit relation with the normally open contacts 4C2 which are closed when the relay 4C is energized. The unlatching solenoid 4CU for unlatching the relay 4C is connected in line L12 with the normally open contacts 4C3, which are closed when the relay 4C is energized, and the normally open limit switch contacts LS–1a, which are closed when the limit switch LS–1 is actuated in response to the pusher 16 reaching its forwardmost position to move a block B from the pattern-forming area to the transfer plate 12. A solenoid 120b for actuating a valve (not shown) which will direct fluid to the cylinder 120 for retracting the pusher 16 to the rearwardmost position, illustrated in FIG. 1, is connected in line L13 with the normally closed contacts 4C4 which are opened when the relay 4C (line L5) is energized.

The solenoid 104a for actuating a valve (not shown) which will direct fluid to the fluid motor 104 in such a direction as to move the sensor plate 22a and the carriage 88 upwardly is connected in line L14 with the normally open set of contacts 8C4, which are closed when the relay 8C is energized, and a normally closed set of timer contacts TD1, which are opened with a timer TD (line L16) is energized and permitted to time out.

Connected in parallel with the timer contacts TD1 and the relay contacts 8C4 are normally open sets of relay contacts 7C6 and 7C5, respectively, which are closed when the relay 7C is energized. Connected between the junction 124 of the contacts 7C5 and 7C6 and the line L2 is the timer TD (line L16). The control relay 8C (line L17), for stopping upward movement of the elevator 14, is connected in series circuit relation with the normally closed set of contacts 8C2 which are opened when the relay 8C is energized, and the limit switch contacts LS–10a which are closed when the limit switch LS–10 is actuated by the actuating member 86 of the sensor mechanism 22. A solenoid 104b for actuating a valve so as to direct fluid to the fluid motor 104 in such a direction as to move the sensor 22 downwardly, is connected in line L18 with a normally closed set of contacts 8C5 which are opened when the relay 8C is energized, and the normally closed contacts 7C7 which are opened when the relay 7C is energized.

Connected in line L19 is a control relay 2C which is provided for the purpose of slowing the rate of ascent of elevator 14, and is connected in series circuit with the normally open set of limit switch contacts LS–9a which are closed when the actuator arm 84 on the limit switch LS–9 engages the actuating member 86.

A solenoid 60a (line L20) is provided for directing fluid to the fluid motor 60 in such a direction as to move the block carriage plate 12 forwardly on the rollers 52. The solenoid 60a is connected in series circuit relation with the normally open timer contacts TD2 which close when the timer TD (line L16) times out, sets of normally closed contacts 3C5 and 2C3, which open when the relays 3C and 2C are energized, respectively, and a set of normally closed limit switch contacts LS–2a which are opened with the limit switch LS–2, mounted on the frame F, is energized, as the plate 12 reaches its forward position.

A solenoid 80a (line L21) is provided for actuating a valve (not shown) for directing fluid to the stripping cylinder 80 in such a direction as to swing the stripping plate 70 downwardly to the stripping position. The solenoid 80a is connected with the normally closed contacts 5C2 which are opened when the relay 5C is energized, and the normally open contacts 3C6 which are closed when the relay 3C is energized. Connected in parallel with the contacts 3C6 (line L23) is a set of normally open limit switch contacts LS–2b which are closed when the limit switch LS–2, mounted on the elevator 14, is actuated as the block supporting carriage plate 12 reaches its forwardmost position.

The control relay 3C (line L24) for initiating the return of the block supporting carriage plate 12, is connected with the normally closed set of contacts 3C2 and the set of normally open limit switch contacts LS–3a, which are closed when the limit switch LS–3, mounted on the frame F in the path of the gate 70 is actuated as the stripping gate 70 is swung to its downward position. Connected between the junction 126 of the limit switch contacts LS–3a and the normally closed contacts 3C2 is a series circuit in line L22, including sets of normally open contacts 3C4 and 7C3 which are closed when the relays 3C and 7C are energized respectively, a set of normally closed contacts 5C4 which are opened when the relay 5C is energized and the relay coil 7CU, which when energized, unlatches the relay 7C (line L4) and permits it to return to its original position.

A solenoid 60b (line L25) for directing fluid to the cylinder 60 in such a manner as to retract the piston rod 62 and retracting the block supporting carriage plate 12 is connected with the normally open contacts 3C7 which are closed when the relay 3C is energized.

The solenoid 50b for actuating the valve (not shown) which directs fluid to the cylinder 50 in such a manner as to move the elevator piston rod 49 downwardly, is connected in line L26 with the normally closed set of contacts 1C3, which are opened when the relay 1C is energized, the normally closed sets of contacts 3C8 and 5C3 which are closed when the relays 3C and 5C are energized respectively, and the normally closed set of limit switch contacts LS-3b which are opened when the limit switch LS-3 is actuated by the stripper plate 70 moving to its stripping position. Connected between the line L2 and the junction 128 of the contacts 5C3 and LS-3b, is a solenoid 80b for directing fluid to the cylinder 80 in such a direction as to swing the stripping plate 70 to its retracted, upward position (illustrated in chain lines in FIG. 3).

The control relay for returning the stripper plate 70 to its raised position is illustrated at 5C in line L28, connected in series circuit relation with the normally open limit switch contacts LS-4b, which are closed when the limit switch LS-4, mounted on the frame F, is actuated as the block supporting carriage plate 12 returns to its starting position.

Connected in line L29 are the normally open contacts 1C4, which are closed when the relay 1C is energized, and a solenoid 130 which operates a single solenoid, spring returned valve (not shown) so as to direct fluid to the hydraulic cylinder 50 along a second path in such a manner as to assist the valve actuated by solenoid 50a to move the piston 49 upwardly.

THE OPERATION

Figure 5:
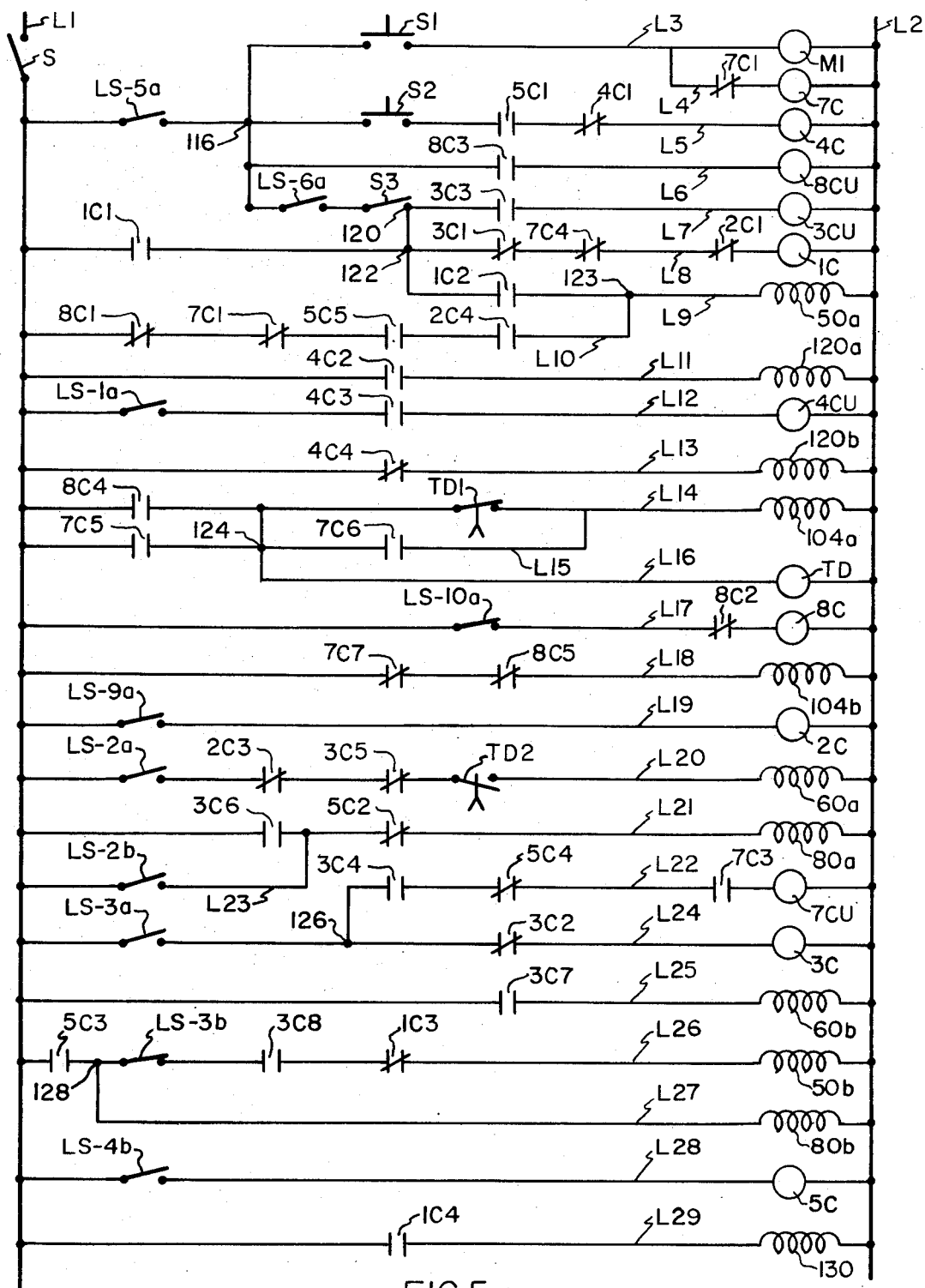
FIG. 5 is a schematic diagram of an electrical control circuit for controlling the operation of the mechanism illustrated in FIGS. 1 – 4.

The operation will be described with particular reference to the control circuit illustrated in FIG. 5. Initially, the elevator 14 is in the lowered position illustrated in FIG. 1 so that the limit switch LS-5 is tripped to close the contacts LS-5a (line L5), the pusher 16 is in its retracted position to trip the limit switch LS-6 so that the contacts LS-6a (line L7) are closed, and the block supporting transfer plate 12 is in the retracted position to trip the limit switch LS-4 and close the normally open limit switch contacts LS-4b (line L28) to energize the relay 5C (line L28), and close the contacts 5C1 and 5C5 (lines L5 and L10 respectively. The block sensing mechanism 22 is also initially in the raised, chain line position, and the control relay 3C has been manually latched. The sensor plate 22a is raised, the relay 8C is unlatched, and the relay 7C is latched and will remain latched during the formation of the first tier.

After a series of blocks have been transferred to the pattern-forming area and the operator forms the patterns desired, the block transfer switch S2 (line L5) is closed to energize the relay 4C (line L5) to close the contacts 4C2 (line L11) and energize the solenoid 120a which moves the pusher 16 forwardly to move the blocks B onto the carriage plate 12. When the pusher 16 moves forwardly, the limit switch LS-1 is actuated to close the contacts LS-1a (line L12) to unlatch the relay 4C so that the contacts 4C4 (line L13) are again closed to energize the retract solenoid 120b for retracting the pusher 16 to its original position. The operator may continue to actuate the switch S2 to move as many blocks as desired onto the plate 12, until one complete tier is grouped.

The operator then manually closes the elevator raise switch S3 (line L7) to energize the unlatching coil 3CU (line L7) and unlatch the relay 3C (line L24) to open the contacts 3C1 in line L8 which precludes the contact 1C2 and 1C4 (lines L9 and L29) from closing, thus preventing the elevator 14 from being moved upwardly. Because the relay 7C is in the latched condition, the timer TD (line L16) is energized to maintain the contacts TD2 (line L20) closed and energize the carriage plate advance solenoid 60a when the contacts 3C5 are closed, for moving the block supporting carriage plate 12 forwardly over the pallet 18. When the plate 12 reaches forwardmost position over pallet 18, limit switch LS-2 is actuated to open the contacts LS-2a (line L20) to halt the forward movement of the plate 12. The contacts LS-2b (line L23) also close to energize the gate lowering solenoid 80a (line L21) for moving the stripping plate 70 to the solid line position illustrated in FIG. 3. When the stripping plate 70 moves downwardly, it actuates the limit switch LS—3 and closes the contacts LS-3a to again energize the relay 3C (line L24) to open the contacts 3C5 (line L20). When the relay 3C (line L24) is energized, the contacts 3C5 and 3C7 (lines L20 and L25) open and close respectively to deenergize the solenoid 60a and to energize the solenoid 60b for returning the plate 12 to its starting position. When the carriage plate 12 is returned to its starting position, the limit switch LS-4 is actuated to close the contacts LS-4b (line L28) and energize the relay 5C which closes the contacts 5C3 (line L26) to energize the gate retract solenoid 80b for retracting the stripping plate 70 to its raised position illustrated in chain lines in FIG. 3. When the control relay 3C (line L24) is energized, the contacts 3C4 (line L22) close to energize the unlatch solenoid 7CU for unlatching the relay 7C (line L4).

When the relay 3C (line L24) is energized to close the contacts 3C4 in line L22, and the carriage plate 12 is in the return position, so that the limit switch LS-4 is actuated and the relay 5C is energized to close the contacts 5C4 (line L22), the unlatch coil 7CU (line L22) is energized to unlatch the relay 7C (line L24) and deenergize the timer TD (line L16). When the relay 7C is deenergized, the contacts 7C7 (line L18) close to energize the solenoid 104b for directing fluid to the fluid motor 104 in such a direction as to move the feeler plate 22a downwardly into engagement with the tier of blocks on the pallet 18 at which time the motor 104 operates merely to hold the plate 22a in position.

The operator then repeatedly closes the block transfer switch S2 until the pusher 16 has moved an appropriate number of blocks B to the plate 12 to form a second layer thereon. The operator then again closes the elevator raise switch S3 (line L7) to again energize the elevator start relay 1C, through the normally closed contacts 3C1, 7C4 and 2C1. When the relay 1C is energized, the contacts 1C2 (line L9) close to energize the solenoid 50a and close the contacts 1C4 (line L29) for energizing the solenoid 130 (line L29) so as to direct fluid to the cylinder 50 along the two paths (200 and 201), previously mentioned, to rapidly move the elevator 14 upwardly.

As the elevator 14 is moved upwardly, the plunger 84 of the limit switch LS-9 will engage the actuator member 86 to close the contacts LS-9a (line L19) and energize the relay 2C for reducing the rate of ascent of the elevator. When the relay 2C (line L19) is energized, the contacts 2C1 (line L8) open to deenergize the control relay 1C (line L8). When the relay 1C is deenergized, the contacts 1C4 (line L29) open to deenergize the solenoid 130 and prevent fluid from being directed to the cylinder 50 in this path. When the relay 1C is deenergized, the contacts 1C2 (line L9) also open, however, the solenoid 50a is not deenergized because the contacts 2C4 (line L10) have been closed to hold the solenoid 50a energized and the elevator continues to move upwardly at a slowed rate of ascent, until the plunger 87 of the limit switch LS-10 trips the actuator 86 on the carriage 88 to open the limit switch contacts LS–10a (line L17) and deenergize the relay 8C (line L17) which stops the elevator. When the relay 8C is deenergized, the contacts 8C1 (line L10) are opened to deenergize the solenoid 50a to completely halt upward movement of the elevator 14. At this time, the contacts 8C5 (line L18) are opened, and the contacts 8C4 (line L14) are closed to energize the solenoid 104a for directing fluid to the motor 104 to move the sensor plate 22a upwardly toward the inoperative position illustrated in chain lines. At the same time, the timer TD (line L16) is energized and, after a predetermined time, the contacts TD1 (line L14) open to interrupt further upward movement of the sensor mechanism 22. Because the sensor plate is not moved to its uppermost position each time a tier is loaded, the loading may occur at a faster rate.

After the sensor mechanism 22 is moved upwardly, the timer contacts TD2 (line L20) close to energize the solenoid 60a (line L20) to move the carriage plate 12 forwardly over the first tier of blocks. When the plate 12 reaches its forwardmost position, the limit switch contacts 2C3 (line L20) open to deenergize the plate forwarding solenoid 60a and the limit switch contacts LS–2b (line L23) close to energize the solenoid 80a for swinging the stripping plate 70 to the stripping position. As the stripping plate 70 swings downwardly, the contacts LS–3a (line L24) again close to energize the plate retract relay 3C (line L24) which closes the contacts 3C7 (line 25) for laterally retracting the carriage plate 12. When the carriage plate 12 reaches its retracted position, the contacts LS–4b (line L28) are again closed to energize the solenoid 5C, which closes the contacts 5C3 (line L26) for energizing the stripping plate retract solenoid 80b (line L27). When the contacts 5C3 (line L26) are energized, and the contacts 3C8 are energized, the path is complete through the solenoid 50b so as to direct fluid to the opposite side of the cylinder 50 for permitting the elevator 14 to lower at a slow rate. As the elevator is moving downwardly, the limit switch LS–10 is deactuated to open contacts LS–10a (line 17) and deenergize the control relay 8C which permits the contacts 8C5 (line L18) to close when the limit switch contacts LS-5a close after the elevator has returned to its starting position to actuate the limit switch LS-5. When the contacts LS-5a are closed, the unlatching coil 8CU is energized to close the contacts 8C5. This energizes the solenoid 104b for returning the sensor plate 22a downwardly into engagement with the second tier of blocks. The motor 104 continues to move the plate 22a downwardly until the plate 22a engages one of the blocks in the second tier. When the elevator has reached its lowermost position, the limit switch LS-5 is again actuated to close the contacts LS–5a (line L5) and the circuit is set for the cycle of operation to be repeated. Finally, when a cube has been "built" to the height desired, the operator depresses switch S1 and removes the completed cube to discharge conveyor P.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Block cubing apparatus for stacking tiers of blocks in cubes comprising:

support frame means;

support means on which tiers of blocks are to be stacked carried by said frame means;

a transfer member disposable in a block-receiving position for receiving and supporting blocks and movable to a discharge position over said support means;

means on said frame means for moving said transfer member between said block-receiving position and said discharge position including means for elevating said transfer member between said block receiving position and a raised position above the uppermost tier of blocks on said support means;

means on said frame means for removing said transfer member from the blocks supported thereby to release the blocks to be supported by said support means; and means for determining the position to which said transfer member is to be raised comprising:

block height sensing means vertically movable independently of said elevating means between a raised position vertically removed from the blocks and a lowered block height sensing position; and locating means, including a part carried for movement with said elevating means for independent movement relative to said sensing means, operative according to the vertical position of said sensing means after a predetermined movement of said part relative to said sensing means and as said transfer member is moved upwardly, for interrupting further upward movement of said elevating means.

2. The block cubing apparatus of claim 1 wherein said block height sensing means in lowered position engages the uppermost tier of blocks on said support means to positively locate said sensing means and prevent its further downward movement; said locating means being engageable with said sensing means in the lowered block engaging position to interrupt further upward movement of said support means.

3. The block cubing apparatus of claim 1 wherein said elevating means includes motor means and said locating means includes means, for controlling energization of said motor means, which is movable into engagement with said sensing means when said elevating means is moving upwardly to disable said motor means.

4. Apparatus as set forth in claim 1 wherein means for moving said sensing means is provided and includes means for moving said sensing means upwardly to said raised position prior to said transfer member being moved to a position over said support means.

5. Apparatus as set forth in claim 1 wherein said elevating means includes means for initially moving said transfer member upwardly at a predetermined rate for a predetermined distance, and means operative according to the vertical position of said sensing means for moving said elevator upwardly through a second predetermined lesser distance at a second predetermined lesser rate.

6. Apparatus as set forth in claim 1 including means for disabling operation of said elevating means and for disabling operation of said sensing means until after said transfer member moves a first tier of blocks to said support means.

7. The apparatus of claim 1 wherein said support means comprises a pallet and a conveyor for supporting and moving a block loaded pallet to a remote location.

8. The apparatus of claim 1 wherein means for moving said sensing means between said raised and lowered positions is provided including means for moving said sensing means to said lowered position before said transfer member is moved to said raised position, and for moving said sensing means to said raised position before said transfer member is moved to discharge position over said support means.

9. The apparatus of claim 8 wherein said sensing means in said lowered position physically engages the uppermost tier of blocks on said support means to positively interrupt downward movement thereof; and said responsive means includes means supported by said elevating means which is engageable with said sensing means in said lowered position to interrupt further upward movement of said elevating means.

10. The apparatus of claim 9 wherein said means for moving said sensing means comprises motor means which is disabled when said sensing means engages the uppermost tier of blocks.

11. The apparatus set forth in claim 1 wherein said locating means includes an actuator on one of said block height sensing means and said elevating means for movement therewith and control means on the other of said block height sensing means and said elevating means for movement therewith for controlling the vertical position of said elevating means in response to the relative vertical positions of said actuator and said control means.

12. Block cubing apparatus for stacking tiers of blocks in cubes comprising:
   support frame means;
   support means on which tiers of blocks are to be stacked carried by said frame means;
   block receiving means, including transfer means, for receiving blocks at a block-receiving station and moving them across to a discharge station over said support means;
   said transfer means being mounted for vertical movement on said frame means;
   means on said frame means for operating said transfer means to move said blocks between said block receiving and discharge stations including means for vertically moving said transfer means to position said transfer means vertically with respect to the uppermost tier of blocks on said support means; and
   means for limiting said vertical movement of said transfer means including:
   block height sensing means vertically movable independently of said transfer means between an inoperative position vertically removed from the blocks on the support means and out of the path of blocks being transferred by said transfer means and an operative block height sensing position for sensing the height of the blocks on said support means; and
   means responsive to said block height sensing means for interrupting vertical movement of said transfer means.

13. The apparatus set forth in claim 12 including means for moving said block height sensing means to said vertically removed position prior to said transfer means moving blocks to said discharge station.

14. The apparatus set forth in claim 13 wherein said transfer means includes a transfer member disposable in a block-receiving position at said block-receiving station for supporting blocks, and movable to a discharge position at said discharge station over said support means;
   said operating means including means for moving said transfer member between said block-receiving and discharge stations including means for vertically moving said transfer member to position said transfer member above the uppermost tier of blocks on said support means; and
   means is provided for moving said transfer member from the blocks supported thereby when said transfer member is over said support means to release the blocks to be supported by said support means.

15. Block cubing apparatus for stacking tiers of blocks in cubes comprising:
   support frame means;
   support means on which tiers of blocks are to be stacked carried by said frame means;
   block receiving means, including transfer means, for receiving blocks at a block-receiving station and moving them across to a discharge station over said support means;
   said transfer member being mounted for vertical movement on said frame means;
   means on said frame means for operating said transfer means to move said blocks between said block-receiving and discharge stations including means for vertically moving said transfer means to position said transfer means vertically with respect to the uppermost tier of blocks on said support means;
   means for limiting said vertical movement of said transfer means including:
   block height sensing means vertically movable independently of said transfer means between an inoperative position out of the path of blocks being transferred by said transfer means and an operative block height sensing position for sensing the height of the blocks on said support means;
   means for moving said block height sensing means between said inoperative and operative block height sensing positions; and
   means responsive to said block height sensing means in said block height sensing position for interrupting said vertical movement of said transfer means; and means for preventing said transfer means from moving blocks to said discharge position until after said sensing means has been moved to said inoperative position.

16. The block cubing apparatus set forth in claim 15 wherein said transfer means comprises a transfer member disposable in a block-receiving position at said receiving station for supporting blocks, and movable to a discharge position at said discharge station over said support means;

said operating means including means for moving said transfer member between said block receiving and discharge positions;

said means for relatively vertically moving said transfer member and said support means including means for relatively vertically moving said transfer member and said support member to position said transfer member above the uppermost tier of blocks on said support means; and means is provided for removing said transfer member from the blocks supported thereby when said transfer member is over said support means to release the blocks to be supported by said support means.

17. The apparatus of claim 16 wherein said vertical moving means includes motor means and one of said sensing means and said vertical moving means supports motor control means for controlling the speed of said motor means, the other of said sensing means and said vertical moving means supports actuator means for actuating said motor control means during said relative vertical movement to control the speed of said motor means.

18. The apparatus of claim 17 wherein said motor control means includes first and second vertically spaced actuable members successively engageable with said actuator means during said relative movement, said first actuable member being responsive to engagement with said actuating member for substantially reducing the speed of said motor means; said second actuable member being responsive to engagement with said actuating member to halt said relative movement.

19. The apparatus of claim 18 wherein said sensing means in said operative position is in physical engagement with the uppermost tier of blocks.

* * * * *